United States Patent
Kasten et al.

(10) Patent No.: US 9,351,069 B1
(45) Date of Patent: May 24, 2016

(54) METHODS AND APPARATUSES FOR AUDIO MIXING

(71) Applicant: Google Inc., Mountain View, CA (US)

(72) Inventors: Glenn Kasten, Mountain View, CA (US); Jean-Michel Roland Trivi, Mountain View, CA (US); Eric Laurent, Mountain View, CA (US)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/927,636

(22) Filed: Jun. 26, 2013

Related U.S. Application Data

(60) Provisional application No. 61/665,288, filed on Jun. 27, 2012.

(51) Int. Cl.
| | |
|---|---|
| *H04B 1/00* | (2006.01) |
| *G06F 17/00* | (2006.01) |
| *H04R 3/00* | (2006.01) |
| *G11B 20/10* | (2006.01) |
| *H04H 60/04* | (2008.01) |

(52) U.S. Cl.
CPC ........ *H04R 3/00* (2013.01); *G11B 2020/10546* (2013.01); *H04H 60/04* (2013.01)

(58) Field of Classification Search
None
See application file for complete search history.

(56) References Cited

U.S. PATENT DOCUMENTS

| | | | | |
|---|---|---|---|---|
| 2002/0082732 | A1* | 6/2002 | Suyama et al. | 700/94 |
| 2008/0243280 | A1* | 10/2008 | Miyata et al. | 700/94 |
| 2013/0123019 | A1* | 5/2013 | Sullivan | A63F 13/12 463/42 |
| 2014/0010375 | A1* | 1/2014 | Usher et al. | 381/27 |
| 2014/0270251 | A1* | 9/2014 | Neufeld et al. | 381/94.5 |
| 2015/0066175 | A1* | 3/2015 | Tremblay et al. | 700/94 |

* cited by examiner

*Primary Examiner* — Regina N Holder
(74) *Attorney, Agent, or Firm* — McDonnell Boehnen Hulbert & Berghoff LLP

(57) ABSTRACT

An example system may include a first mixer module configured to receive a latency-tolerant audio signal, buffer the latency-tolerant audio signal for a first duration, and process the latency-tolerant audio signal. The system may also include a second mixer module configured to receive the processed latency-tolerant audio signal from the first mixer module. The second mixer may also be configured to receive a latency-sensitive audio signal, where the latency-sensitive audio signal is shorter in duration than the latency-tolerant audio signal, and where the latency-sensitive audio signal corresponds to a user input. The second mixer may also be configured to buffer the latency-sensitive audio signal for a second duration, where the second duration is shorter than the first duration. The second mixer may also be configured to process the latency-sensitive audio signal, and combine the processed latency-tolerant audio signal and the processed latency-sensitive audio signal to create a combined signal.

23 Claims, 5 Drawing Sheets

METHODS AND APPARATUSES FOR AUDIO MIXING

CROSS-REFERENCE TO RELATED APPLICATION

This application claims the benefit of U.S. Provisional Application No. 61/665,288, filed Jun. 27, 2012.

BACKGROUND

Certain methods and systems for processing audio signals can be inefficient, power-intensive, and suffer from undesirable audio artifacts. Further limitations and disadvantages of such methods and systems will become apparent to one of skill in the art, through comparison of such approaches with some aspects of the present method and apparatus set forth in the remainder of this disclosure with reference to the drawings.

SUMMARY

In one embodiment, the present disclosure provides a system. The system may include a first mixer module configured to receive a latency-tolerant audio signal, buffer the latency-tolerant audio signal for a first duration, and process the latency-tolerant audio signal so as to modify one or more characteristics of the latency-tolerant audio signal. The system may also include a second mixer module configured to receive the processed latency-tolerant audio signal from the first mixer module. The second mixer may also be configured to receive a latency-sensitive audio signal, where the latency-sensitive audio signal is shorter in duration than the latency-tolerant audio signal, and where the latency-sensitive audio signal corresponds to a user input. The second mixer may also be configured to buffer the latency-sensitive audio signal for a second duration, where the second duration is shorter in time than the first duration. The second mixer may also be configured to process the latency-sensitive audio signal so as to modify one or more characteristics of the latency-sensitive audio signal, and combine the processed latency-tolerant audio signal and the processed latency-sensitive audio signal to create a combined signal.

In another embodiment, the present disclosure provides a method. The method may include receiving a latency-tolerant audio signal into a first mixer module. The method may also include buffering the latency-tolerant audio signal for a first duration. The method may also include processing the latency-tolerant audio signal so as to modify one or more characteristics of the latency-tolerant audio signal. The method may also include receiving the processed latency-tolerant audio signal into a second mixer module. The method may also include receiving a latency-sensitive audio signal, where the latency-sensitive audio signal is shorter in duration than the latency-tolerant audio signal. The method may also include buffering the latency-sensitive audio signal for a second duration, where the second duration is shorter in time than the first duration, and where the latency-sensitive audio signal corresponds to a user input. The method may also include processing the latency-sensitive audio signal so as to modify one or more characteristics of the latency-sensitive audio signal. The method may also include combining the processed latency-tolerant audio signal and the processed latency-sensitive audio signal to create a combined signal.

In yet another aspect, a non-transitory computer readable memory having stored therein instructions executable by a computing device to cause the computing device to perform functions is described. The functions may include receiving a latency-tolerant audio signal into a first mixer module. The functions may also include buffering the latency-tolerant audio signal for a first duration. The functions may also include processing the latency-tolerant audio signal so as to modify one or more characteristics of the latency-tolerant audio signal. The functions may also include receiving the processed latency-tolerant audio signal into a second mixer module. The functions may also include receiving a latency-sensitive audio signal, where the latency-sensitive audio signal is shorter in duration than the latency-tolerant audio signal, and where the latency-sensitive audio signal corresponds to a user input. The functions may also include buffering the latency-sensitive audio signal for a second duration, where the second duration is shorter in time than the first duration. The functions may also include processing the latency-sensitive audio signal so as to modify one or more characteristics of the latency-sensitive audio signal. The functions may also include combining the processed latency-tolerant audio signal and the processed latency-sensitive audio signal to create a combined signal.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
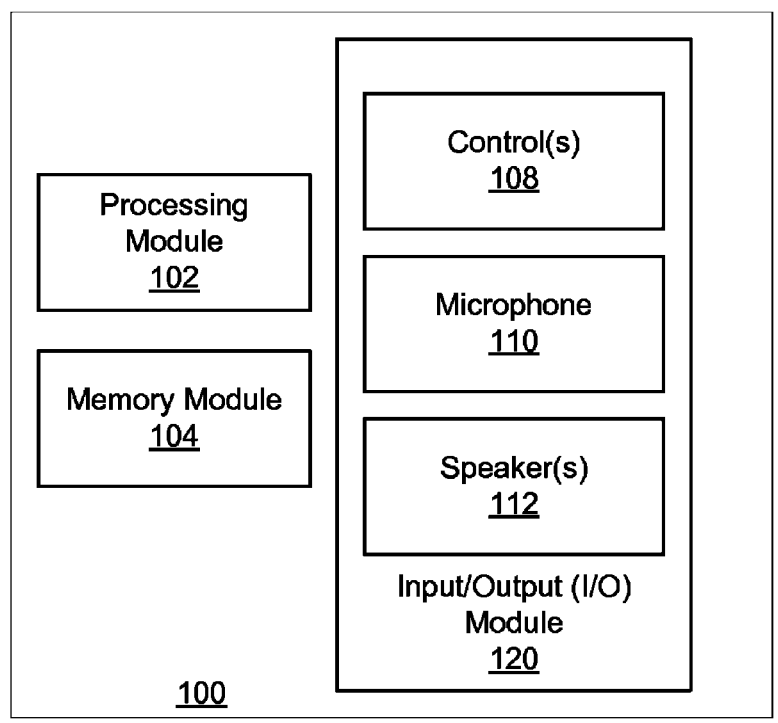
FIG. 1 depicts an example electronic device operable to mix audio signals.

FIG. 1 depicts an example electronic device operable to mix audio signals. The example device 100 comprises a processing module 102, a memory module 104, and an input/output (I/O) module 120.

The processing module 102 may be operable to execute lines of code (e.g., code corresponding to an operating system and/or one or more applications programs) to effect operation of the electronic device 100. Such operation may include processing of audio content as disclosed herein.

The memory module 104 may comprise volatile and/or non-volatile memory which stores, for example, general data, configuration parameters, program code, and/or run-time data generated by the processing module 102 while executing program code. In an example embodiment, the memory module 104 may be distributed among various components of the device 100 and may be utilized for mass storage and/or buffering of audio content.

The input/output (I/O) module 120 may enable a user to interact with the electronic device 100. In this regard, the I/O module 120 may support various types of inputs and/or outputs, including video, audio, and/or text. I/O devices and/or components, external or internal, may be utilized for inputting and/or outputting data during operations of the I/O module 120. The I/O module 120 may comprise, for example, control(s) 108, a microphone 110, and speaker(s) 112.

The controls 108 may comprise, for example, a touchscreen and/or one or more "hard" buttons that enable a user to interact with the device 100. The microphone 110 may be operable to convert acoustic waves into digital electronic signals which may then be stored and/or processed as one or more audio signals. The speaker(s) 112 may be operable to convert electronic signals representing one or more audio signals to corresponding acoustic waves.

In operation, one or more audio signals (e.g., read from memory 104 and/or received from the microphone 110) may be input to the processing module 102. The signals may, for example, comprise one or more latency-tolerant audio signals and one or more latency-sensitive audio signals. For example, for a video game running on the device 100, the latency-tolerant audio signal may comprise the background music, and the latency-sensitive audio signal may comprise sounds that correspond to user input to the video. The latency-tolerant audio signals may tolerate a latency of greater than about 200 milliseconds, while the latency-sensitive audio signals may tolerate a latency of less than about 50 milliseconds. Further, the latency-tolerant audio signals may have a duration greater than 10 seconds, while the latency-sensitive audio signals may have a duration less than 5 seconds. The processing module 102 may perform processing of the audio signals (e.g., equalization, addition of effects, and mixing together of multiple signals) to generate a combined audio signal to be output to the speaker(s) 112 and/or stored to memory 104. Such processing of audio signals may be performed as disclosed herein.

Figure 2:
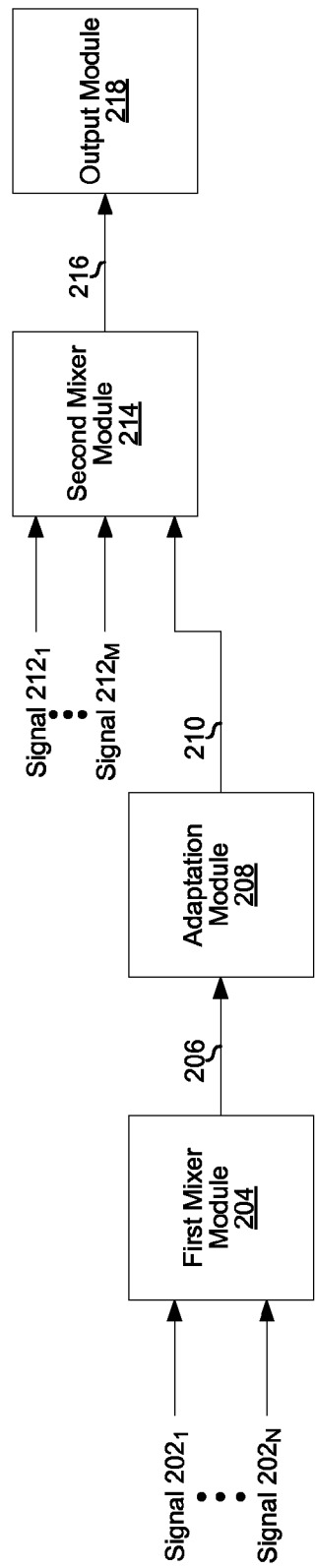
FIG. 2 depicts a mixing subsystem operable to mix audio signals.

FIG. 2 depicts a mixing subsystem operable to mix audio signals. Shown in FIG. 2 are a first mixer module 204, audio signals $202_1$-$202_N$ (where N is an integer greater than or equal to 1) input to the first mixer module 204, an adaptation module 208, a second mixer module 214, and audio signals $212_1$-$212_M$ (where M is an integer greater than or equal to 1) input to the second mixer module 214. The modules shown in FIG. 2 may, for example, be implemented in the processing subsystem 102 described above with respect to FIG. 1.

Each of the audio signals $202_1$-$202_N$ may be, for example, relatively predictable and/or relatively longer in duration. Audio signals $202_1$-$202_N$ may be considered latency-tolerant. In one example, audio signals $202_1$-$202_N$ may tolerate a latency of greater than about 200 milliseconds and may have a duration greater than 10 seconds. One or more of the audio signals $202_1$-$202_N$ may correspond to a music file (e.g., in .mp3 format) that is seconds or minutes in duration. For example, audio signals $202_1$-$202_N$ may correspond to background music in a video game. Accordingly, a relatively larger number of samples and/or frames of the signals $202_1$-$202_N$ may be buffered at a time without unduly increasing the likelihood that undesirable audio artifacts will result (e.g., from unpredictable user input).

Each of the audio signals $212_1$-$212_M$ may be relatively unpredictable and/or shorter in duration. Audio signals $212_1$-$212_M$ may be considered latency-sensitive. In one example, audio signals $212_1$-$212_M$ may tolerate a latency of less than about 50 milliseconds and may have a duration less than 5 seconds. Audio signals $212_1$-$212_M$ may correspond to a user input. For example, one or more of the audio signals $212_1$-$212_M$ may be short-duration "beep" or "clicking" noises (e.g., in .wav format) that provide feedback to a user to let the user know that a mouse click was received. Because the playing of signals $212_1$-$212_M$ is generally unpredictable (e.g., the device 100 doesn't know when the user is going to click the mouse) and requires low-latency (e.g., the "click" sound needs to be close in time to the actual click of the mouse so that the user associates the two and/or doesn't click again), these signals generally cannot be buffered for too long and/or too far in advance of being output without introducing greater likelihood of undesirable audio artifacts. In another example, audio signals $212_1$-$212_M$ may be action-related sounds corresponding to user input in a video game. When the user pushes the buttons on a controller, the audio signals $212_1$-$212_M$ must be close in time to the pushing of the buttons so that the user associates the pushing of the button with the action-related sound. Other examples are possible as well.

The first mixer module 204 may be operable to perform various audio processing functions such as, for example, volume control, mixing of multiple signals into a single signal, sample-rate conversion, filtering, and addition of effects such as reverb. In an example implementation, the first mixer module 204 may cycle between an active state of operation and an idle state of operation. While in the idle state of operation, the first mixer module 204 may buffer samples and/or frames of the audio signals $202_1$-$202_N$. While in the idle state of operation, components of the mixer may be powered down to conserve energy. While in the active state of operation, components of the mixer powered down in the idle state may be powered up and the first mixer module 204 may process the samples and/or frames that were buffered while the first mixer module 204 was in the idle state.

The second mixer module 214 may be operable to perform various audio processing functions such as, for example, volume control, mixing of multiple signals into a single signal, sample-rate conversion, filtering, and addition of effects such as reverb. In an example implementation, the second mixer module 214 may cycle between an active state of operation and an idle state of operation. While in the idle state of operation, the second mixer module 214 may buffer samples and/or frames of the audio signals 210 and $212_1$-$212_M$. While in the idle state of operation, components of the mixer may be powered down to conserve energy. While in the active state of operation, components of the mixer powered down in the idle state may be powered up and the second mixer module 214 may process the samples and/or frames that were buffered while the second mixer module 214 was in the idle state.

In an example implementation, the first mixer module 204 and the second mixer module 214 may be substantially similar or even identical. In another example implementation, audio processing functions performed by the second mixer module 214 may be of relatively lower computational complexity than audio processing functions performed by the first mixer module 204. For example, the second mixer module 214 may be limited to performing only volume control, limited to performing relatively lower-quality sample rate conversion, and/or may be limited in the audio effects that it is operable to add. In such an example, processing the audio signals $202_1$-$202_N$ may utilize a load that is higher than the load utilized for processing the audio signals $212_1$-$212_M$.

The adaptation module 208 may be operable to process the audio signal 206 to generate the audio signal 210. The processing performed may comprise, for example, sample rate conversion, multi-channel virtualization, multi-channel down-mixing, and/or other suitable processing functions to generate the audio signal 210 that is suitable for input to the second mixer module 214. In some embodiments, the adaptation module 208 is not required, and the audio signal 206 may be received by the second mixer module 214 without any additional processing.

The second mixer module 214 may combine audio signal 210 (or audio signal 206 if no adaptation module 208 is required) with the processed audio signals $212_1$-$212_M$ to create a combined signal 216. The combined signal 216 may then be output to an output module 218. In one example, the output module 218 may include one or more speakers. In another example, the output module 218 may include a memory module configured to store the combined signal. Other examples are possible as well.

Operation of the modules shown in FIG. 2 may be as described below with reference to FIGS. 3 and 4.

Figure 3:
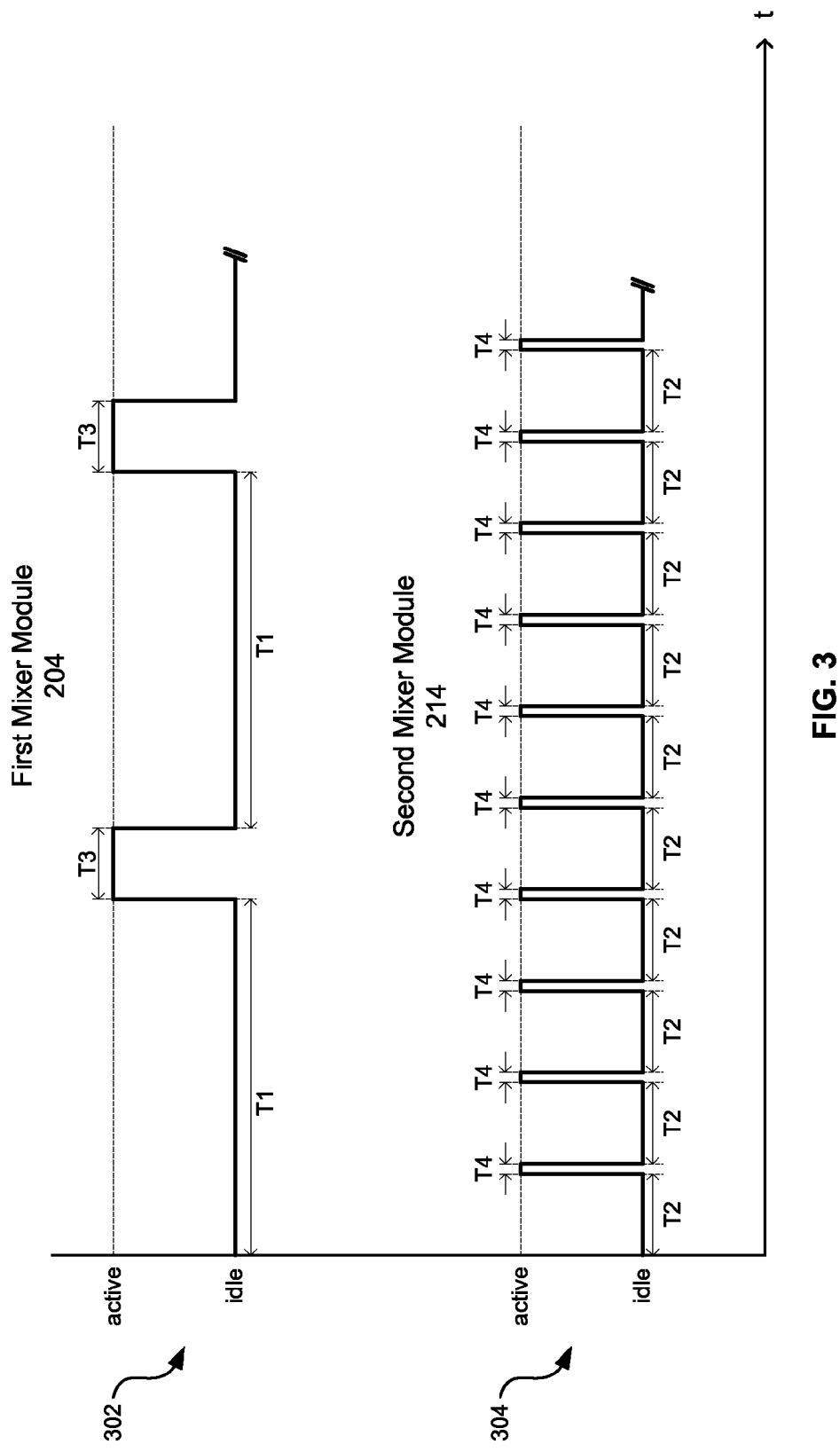
FIG. 3 depicts an example timeline that signals the mode of operation of the mixers shown in FIG. 2.

FIG. 3 depicts an example timeline that signals the mode of operation of the first mixer module 204 and the second mixer module 214 shown in FIG. 2. The timeline 302 shows the state of operation of the first mixer module 204 as it cycles between an idle state of operation and an active state of operation. The average amount of time the first mixer module 204 spends in the idle mode is T1 and the average amount of time the first mixer module 204 spends in the active mode is T3. The timeline 304 shows the state of operation of the second mixer module 214 as it cycles between an idle state of operation and an active state of operation. The average amount of time the second mixer module 214 spends in the idle mode is T2 and the average amount of time the second mixer module 214 spends in the active mode is T4. In an example implementation, T1 may be longer than T2, and T3 may be greater than T4. Other examples are possible as well.

Figure 4:
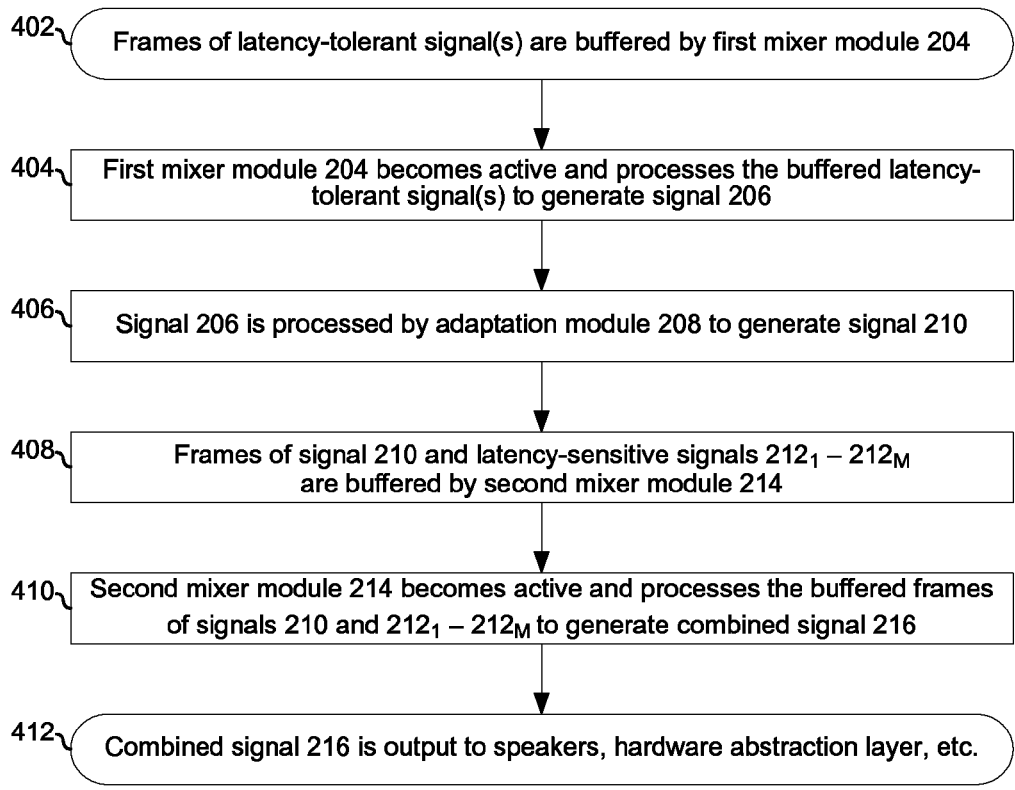
FIG. 4 is a flowchart illustrating example steps for mixing audio signals.

FIG. 4 is a flowchart illustrating example steps for mixing audio signals. The method may be carried out by an operating system, media frameworks, sounds servers, and/or middleware, as examples. The method begins with step 402 in which the first mixer module 204 is in an idle state of operation and samples and/or frames of one or more latency-tolerant audio signal(s) are buffered by the first mixer module 204. In step 404, the first mixer module 204 transitions to an active state of operation and processes the samples and/or frames buffered during step 402 to output samples and/or frames of the signal 206. In step 406, samples and/or frames of the signal 206 are processed by the adaptation module 208 to generate samples and/or frames of the signal 210. In step 408, one or more samples and/or frames of the signal 210 and one or more samples and/or frames of the latency-sensitive signals $212_1$-$212_M$ are buffered by the second mixer module 214. In step 410, the second mixer module 214 transitions to an active state of operation and processes the samples and/or frames that were buffered during step 408 to generate samples and/or frames of the combined signal 216. In step 412, the combined signal 216 is output to an output module 218, such as speakers, a hardware abstraction layer, a memory module and/or to another module that performs additional processing of the combined signal 216.

In an example implementation, a first mixer (e.g., the first mixer module 204 of FIG. 2) may be configured to process one or more first audio signals (e.g., signals $202_1$-$202_N$ of FIG. 2) to generate a first processed audio signal (e.g., signal 206 of FIG. 2), and a second mixer (e.g., the second mixer module 214 of FIG. 2) may be configured to process the first processed audio signal and one or more other audio signals (e.g., signals $212_1$-$212_M$ of FIG. 2) to generate a second processed audio signal 216.

In an example implementation, an adaptation module (e.g., module 208 of FIG. 2) may be configured to process an intermediate audio signal (e.g., signal 206 of FIG. 2) to generate a second intermediate audio signal (e.g., signal 210 of FIG. 2), and the second mixer module may be operable to process the second intermediate audio signal along with one or more other audio signals (e.g., signals $212_1$-$212_M$ of FIG. 2) to generate a combined audio signal (e.g., signal 216 of FIG. 2).

Figure 5:
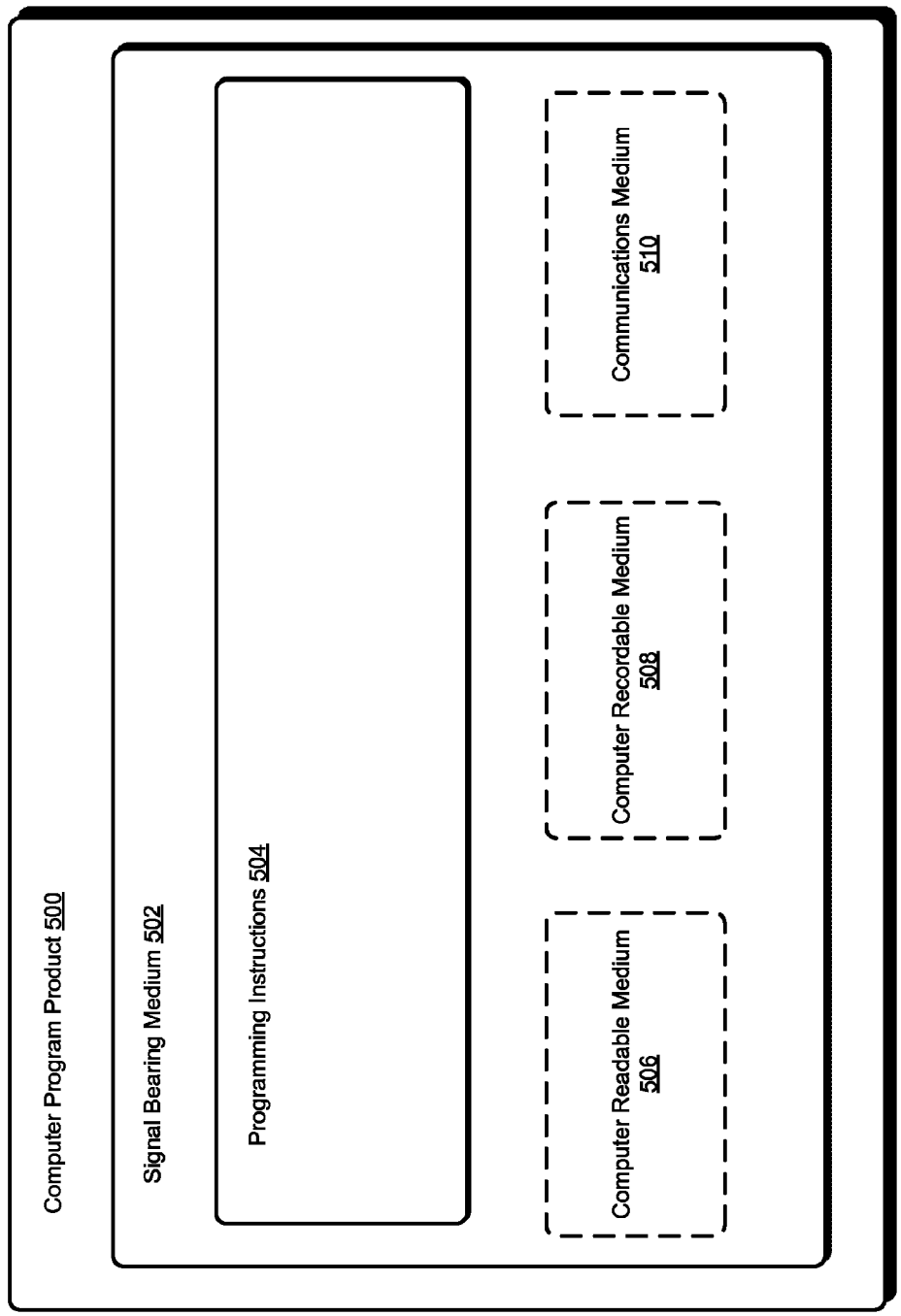
FIG. 5 depicts a computer-readable medium configured according to an example embodiment.

FIG. 5 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed methods can be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 can be a computer-readable medium 506, such as, but not limited to, a hard disk drive, a Compact Disc (CD), a Digital Video Disk (DVD), a digital tape, memory, etc. In some implementations, the signal bearing medium 502 can be a computer recordable medium 508, such as, but not limited to, memory, read/write (R/W) CDs, R/W DVDs, etc. In some implementations, the signal bearing medium 502 can be a communications medium 510, such as, but not limited to, a digital and/or an analog communication medium (e.g., a fiber optic cable, a waveguide, a wired communications link, a wireless communication link, etc.). Thus, for example, the signal bearing medium 502 can be conveyed by a wireless form of the communications medium 510.

The one or more programming instructions 504 can be, for example, computer executable and/or logic implemented instructions. In some examples, a computing device such as the processing module 102 of FIG. 1 is configured to provide various operations, functions, or actions in response to the programming instructions 504 conveyed to the processing module 102 by one or more of the computer-readable medium 506, the computer recordable medium 508, and/or the communications medium 510.

The non-transitory computer-readable medium could also be distributed among multiple data storage elements, which could be remotely located from each other. The device that executes some or all of the stored instructions could be a client-side computing device as illustrated in FIG. 1. Alternatively, the device that executes some or all of the stored instructions could be a server-side computing device.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A system comprising:
   one or more processors;
   a memory module;
   a first mixer module configured to:
      receive a latency-tolerant audio signal; and
      buffer the latency-tolerant audio signal for a first duration; and
   a second mixer module configured to:
      receive the latency-tolerant audio signal from the first mixer module;
      receive a latency-sensitive audio signal, wherein the latency-sensitive audio signal has a duration less than the latency-tolerant signal, and wherein the latency-sensitive audio signal is provided in response to a received input;
      buffer the latency-sensitive audio signal for a second duration, wherein the second duration is shorter in time than the first duration;
      and
      combine the latency-tolerant audio signal and the latency-sensitive audio signal to create a combined signal.

2. The system of claim 1, wherein the second mixer module is further configured to:
   output the combined signal to the memory module and/or a speaker.

3. The system of claim 1, further comprising:
   an adaptation module via which the latency-tolerant audio signal is conveyed from the first mixer module to the second mixer module, wherein the adaptation module is configured to alter a sample rate of the latency-tolerant audio signal.

4. The system of claim 1, wherein:
   the first mixer module is configured to cycle between a first idle state and a first active state, wherein the first mixer module is configured to buffer the latency-tolerant audio signal while the first mixer module is in the first idle state, and wherein the first mixer module is configured to process the buffered latency-tolerant audio signal while the first mixer module is in the first active state; and
   the second mixer module is configured to cycle between a second idle state and a second active state, wherein the second mixer module is configured to buffer the latency-sensitive audio signal while the second mixer module is in the second idle state, and wherein the second mixer module is configured to process the buffered latency-sensitive audio signal while the second mixer module is in the second active state.

5. The system of claim 1, wherein:
   the first mixer module is configured to cycle, at intervals having average duration T1, between a first idle state and a first active state; and
   the second mixer module is configured to cycle, at intervals having average duration T2, between second idle state and second active state, wherein T1 is a finite amount of time, T2 is a finite amount of time, and T1 is greater than T2.

6. The system of claim 1, wherein:
   the first mixer module is configured to process audio signals having a first sample rate;
   the second mixer module is configured to process audio signals having a second sample rate; and
   the first sample rate is different than the second sample rate.

7. The system of claim 1, wherein the first mixer module is further configured to process the latency-tolerant audio signal so as to modify one or more characteristics of the latency-tolerant audio signal, and wherein processing the latency-tolerant audio signal utilizes a first load, wherein processing the latency-sensitive audio signal utilizes a second load, and wherein the first load is greater than the second load.

8. The system of claim 1, wherein the first mixer module is further configured to process the latency-tolerant audio signal so as to modify one or more characteristics of the latency-tolerant audio signal, and wherein processing the latency-tolerant audio signal comprises one or more of:
   sample rate conversion, filtering, and addition of audio effects.

9. The system of claim 1, wherein the first mixer module is further configured to process the latency-tolerant audio signal so as to modify one or more characteristics of the latency-tolerant audio signal, and wherein processing the latency-sensitive audio signal comprises volume control.

10. A method comprising:
    receiving a latency-tolerant audio signal into a first mixer module;
    buffering the latency-tolerant audio signal for a first duration;
    receiving the latency-tolerant audio signal into a second mixer module;
    receiving a latency-sensitive audio signal into the second mixer module, wherein the latency-sensitive audio signal has a duration less than the latency-tolerant signal, and wherein the latency-sensitive audio signal is provided in response to a received input;
    buffering the latency-sensitive audio signal for a second duration, wherein the second duration is shorter in time than the first duration;
    and
    combining the latency-tolerant audio signal and the latency-sensitive audio signal to create a combined signal.

11. The method of claim 10, further comprising:
    outputting the combined signal to a memory module and/or a speaker.

12. The method of claim 10, wherein:
    the first mixer module is configured to cycle between a first idle state and a first active state, wherein the first mixer module is configured to buffer the latency-tolerant audio signal while the first mixer module is in the first idle state, and wherein the first mixer module is configured to process the buffered latency-tolerant audio signal while the first mixer module is in the first active state; and
    the second mixer module is configured to cycle between a second idle state and a second active state, wherein the second mixer module is configured to buffer the latency-sensitive audio signal while the second mixer module is in the second idle state, and wherein the second mixer module is configured to process the buffered latency-sensitive audio signal while the second mixer module is in the second active state.

13. The method of claim 10, wherein:
the first mixer module is configured to cycle, at intervals having average duration T1, between a first idle state and a first active state; and
the second mixer module is configured to cycle, at intervals having average duration T2, between second idle state and second active state, wherein T1 is a finite amount of time, T2 is a finite amount of time, and T1 is greater than T2.

14. The method of claim 10, wherein the method further comprises processing the latency-tolerant audio signal so as to modify one or more characteristics of the latency-tolerant audio signal, and wherein processing the latency-tolerant audio signal comprises one or more of:
sample rate conversion, filtering, and addition of audio effects.

15. The method of claim 10, wherein the method further comprises processing the latency-tolerant audio signal so as to modify one or more characteristics of the latency-tolerant audio signal, and wherein processing the latency-sensitive audio signal comprises volume control.

16. A non-transitory computer-readable storage medium having stored thereon instructions, that when executed by a computing device, cause the computing device to carry out functions comprising:
receiving a latency-tolerant audio signal into a first mixer module;
buffering the latency-tolerant audio signal for a first duration;
receiving the latency-tolerant audio signal into a second mixer module;
receiving a latency-sensitive audio signal into the second mixer module, wherein the latency-sensitive audio signal has a duration less than the latency-tolerant signal, and wherein the latency-sensitive audio signal is provided in response to a received input;
buffering the latency-sensitive audio signal for a second duration, wherein the second duration is shorter in time than the first duration; and
combining the latency-tolerant audio signal and the latency-sensitive audio signal to create a combined signal.

17. The non-transitory computer-readable storage medium of claim 16, wherein functions further comprise:
outputting the combined signal to a memory module and/or a speaker.

18. The non-transitory computer-readable storage medium of claim 16, wherein:
the first mixer module is configured to cycle between a first idle state and a first active state, wherein the first mixer module is configured to buffer the latency-tolerant audio signal while the first mixer module is in the first idle state, and wherein the first mixer module is configured to process the buffered latency-tolerant audio signal while the first mixer module is in the first active state; and
the second mixer module is configured to cycle between a second idle state and a second active state, wherein the second mixer module is configured to buffer the latency-sensitive audio signal while the second mixer module is in the second idle state, and wherein the second mixer module is configured to process the buffered latency-sensitive audio signal while the second mixer module is in the second active state.

19. The non-transitory computer-readable storage medium of claim 16, wherein:
the first mixer module is configured to cycle, at intervals having average duration T1, between a first idle state and a first active state; and
the second mixer module is configured to cycle, at intervals having average duration T2, between second idle state and second active state, wherein T1 is a finite amount of time, T2 is a finite amount of time, and T1 is greater than T2.

20. The non-transitory computer-readable storage medium of claim 16, wherein the functions further comprise processing the latency-tolerant audio signal so as to modify one or more characteristics of the latency-tolerant audio signal, and wherein processing the latency-tolerant audio signal utilizes a first load, wherein processing the latency-sensitive audio signal utilizes a second load, and wherein the first load is greater than the second load.

21. The system of claim 1, wherein the second mixer module is further configured to:
process the latency-sensitive audio signal so as to modify one or more characteristics of the latency-sensitive audio signal.

22. The method of claim 10, further comprising:
processing the latency-sensitive audio signal so as to modify one or more characteristics of the latency-sensitive audio signal.

23. The non-transitory computer-readable storage medium of claim 16, wherein functions further comprise:
processing the latency-sensitive audio signal so as to modify one or more characteristics of the latency-sensitive audio signal.

* * * * *